(12) United States Patent
Simon et al.

(10) Patent No.: US 12,449,469 B2
(45) Date of Patent: Oct. 21, 2025

(54) DEVICE FOR ACOUSTIC DETECTION OF AN ELECTRIC ARC

(71) Applicant: OFFICE NATIONAL D'ETUDES ET DE RECHERCHES AÉROSPATIALES, Palaiseau (FR)

(72) Inventors: Frank Simon, Palaiseau (FR); Delphine Sebbane, Palaiseau (FR)

(73) Assignee: OFFICE NATIONAL D'ETUDES ET DE RECHERCHES AEROSPATIALES, Palaiseau (FR)

( * ) Notice: Subject to any disclaimer, the term of this patent is extended or adjusted under 35 U.S.C. 154(b) by 0 days.

(21) Appl. No.: 18/881,163

(22) PCT Filed: Jul. 5, 2023

(86) PCT No.: PCT/EP2023/068589
§ 371 (c)(1),
(2) Date: Jan. 3, 2025

(87) PCT Pub. No.: WO2024/008811
PCT Pub. Date: Jan. 11, 2024

(65) Prior Publication Data
US 2025/0172604 A1      May 29, 2025

(30) Foreign Application Priority Data
Jul. 5, 2022   (FR) ..................................... 2206853

(51) Int. Cl.
*G01R 31/12*      (2020.01)
*G01R 31/16*      (2006.01)

(52) U.S. Cl.
CPC ..... *G01R 31/1209* (2013.01); *G01R 31/1272* (2013.01); *G01R 31/16* (2013.01)

(58) Field of Classification Search
CPC .... G01N 27/92; G01R 31/1209; G01R 31/12; G01R 31/1272; G01R 31/1263;
(Continued)

(56) References Cited

U.S. PATENT DOCUMENTS 10,534,031 B2   1/2020 Godfrey et al.
10,902,088 B2 * 1/2021 Léonard ............ G06F 18/21343
(Continued)

FOREIGN PATENT DOCUMENTS

EP    3492934 A1   6/2019
ES    2301406 A1   6/2008

OTHER PUBLICATIONS

International Search Report and Written Opinion issued in corresponding International Application No. PCT/EP2023/068589, mailed Oct. 27, 2023, European Patent Office, Rijswijk, Netherlands, pp. 1-7.
(Continued)

*Primary Examiner* — Lisa M Caputo
*Assistant Examiner* — Eric Sebastian Von Wald
(74) *Attorney, Agent, or Firm* — Hauptman Ham, LLP

(57)    ABSTRACT

A device for acoustic detection of an electric arc, including a tubular probe suitable for being arranged next to a piece of electrical equipment on which an electric arc is likely to form. An interior space, circumscribed by a wall of the probe, extends along the length of the probe. This interior space is filled with a fluid and acoustically isolated from external noise by the wall. The probe includes, at the periphery of its interior space, on its wall, at least one vulnerable zone suitable for degrading under the effect of the electric arc, revealing a passage to the interior space for an acoustic wave generated by the electric arc. The device further includes at least one acoustic sensor suitable for
(Continued)

detecting the acoustic wave that travelled through the passage and propagated in the interior space of the probe.

14 Claims, 4 Drawing Sheets

(58) Field of Classification Search
CPC ... G01R 31/1254; G01R 31/1227; G01R 31/16; G01R 31/14; G01R 29/12; G01R 31/3272; G01R 31/58; G01R 31/086; G01R 31/2863; G01R 29/0878; G01R 31/50; G08B 21/182; H01H 33/26; H02B 13/065; H02G 1/00; H02H 1/0015; H02H 7/20
See application file for complete search history.

(56) References Cited

U.S. PATENT DOCUMENTS

| | | |
|---|---|---|
| 2012/0105073 A1 | 5/2012 | Kuettner et al. |
| 2017/0074920 A1* | 3/2017 | Di Stefano ............ G01R 31/16 |
| 2022/0018887 A1* | 1/2022 | Hencken ............ G01R 31/3271 |

OTHER PUBLICATIONS

Written Opinion issued in corresponding International Application No. PCT/EP2023/068589, mailed Oct. 27, 2023, European Patent Office, Rijswijk, Netherlands, pp. 1-5.

* cited by examiner

[Fig 1]
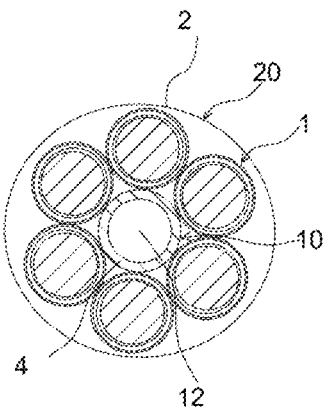
[Fig 2]
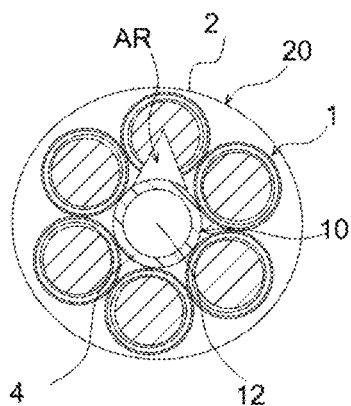
[Fig 3]
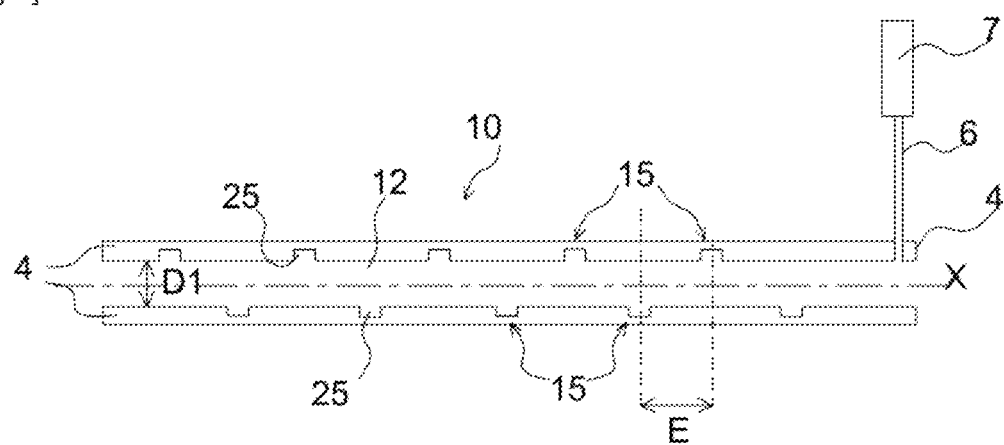

[Fig 4]
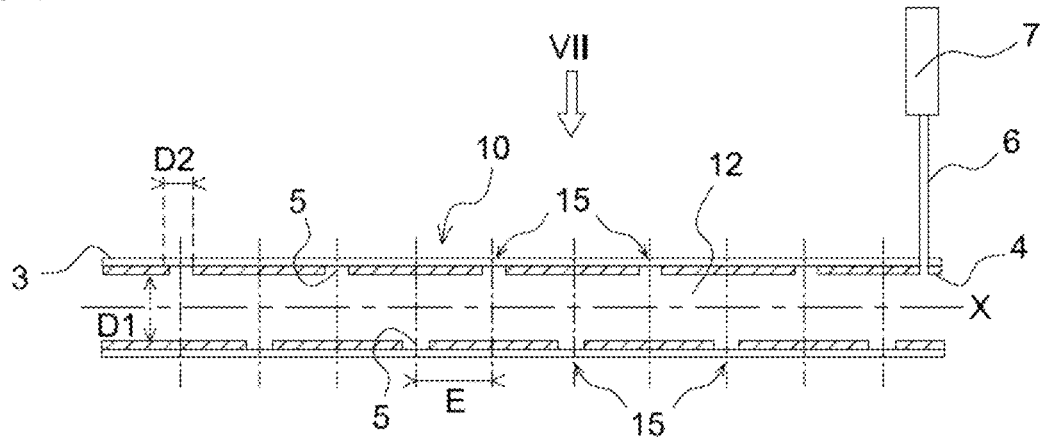
[Fig 5]
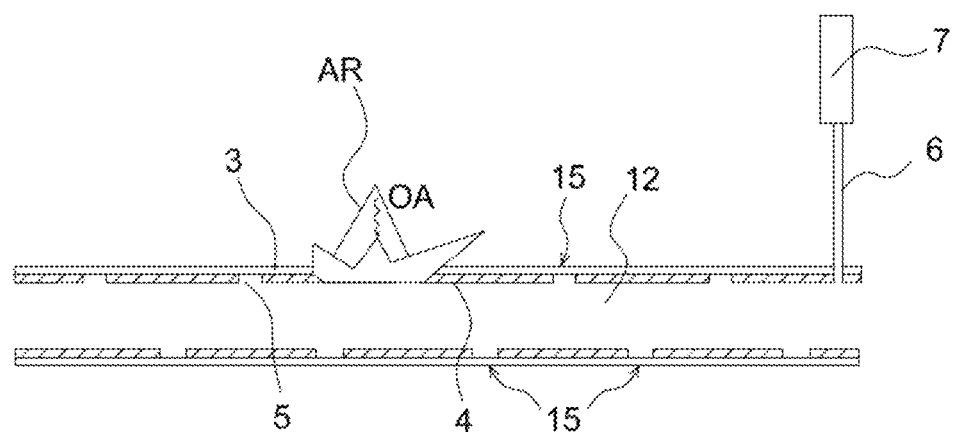
[Fig 6]
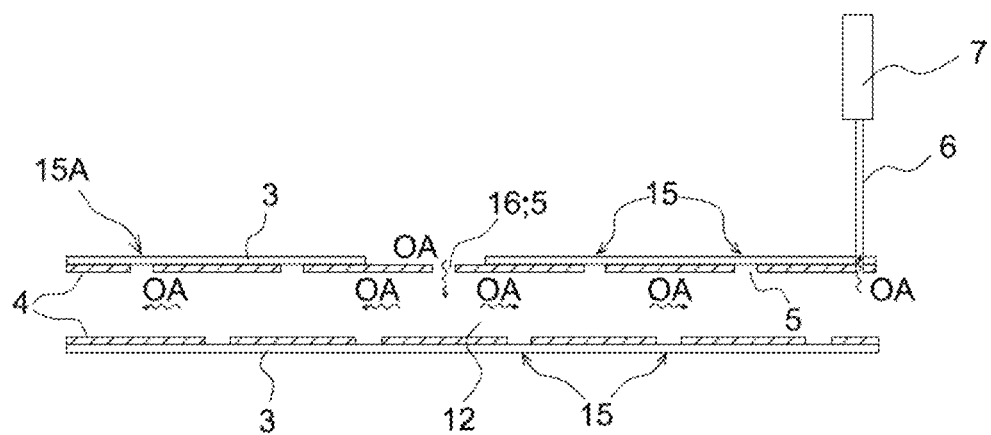

[Fig 7]
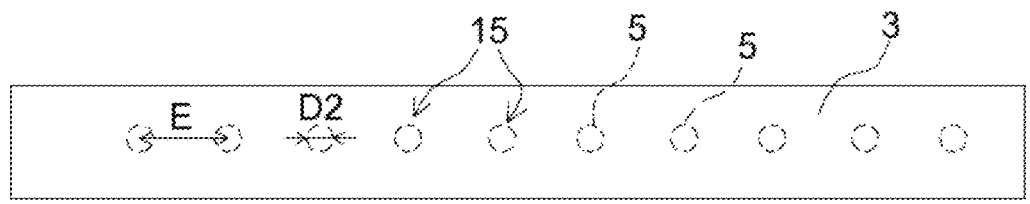
[Fig 8]
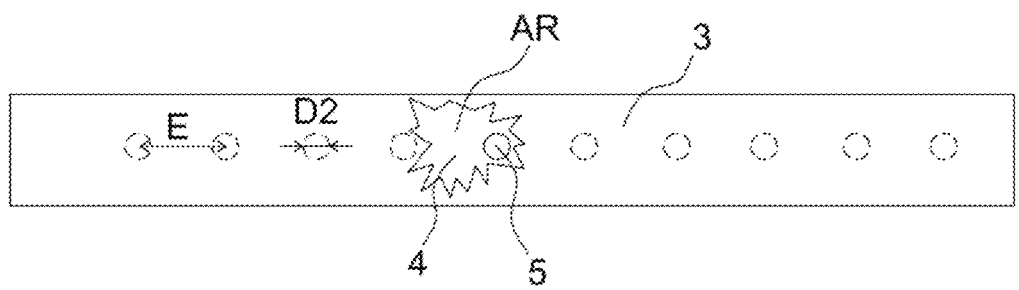
[Fig 9]
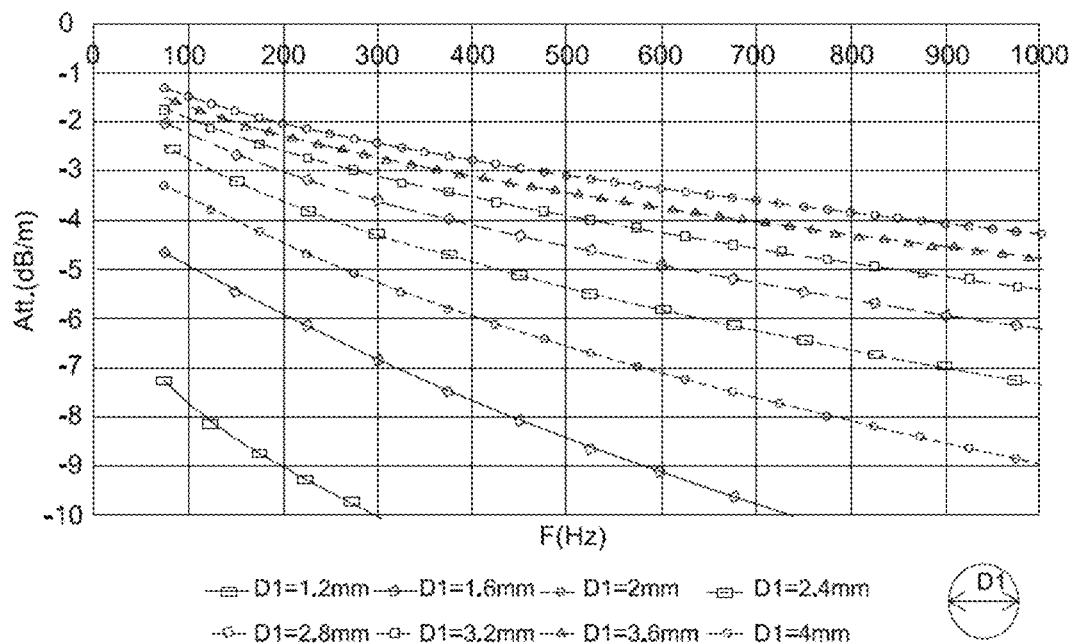

[Fig 10]
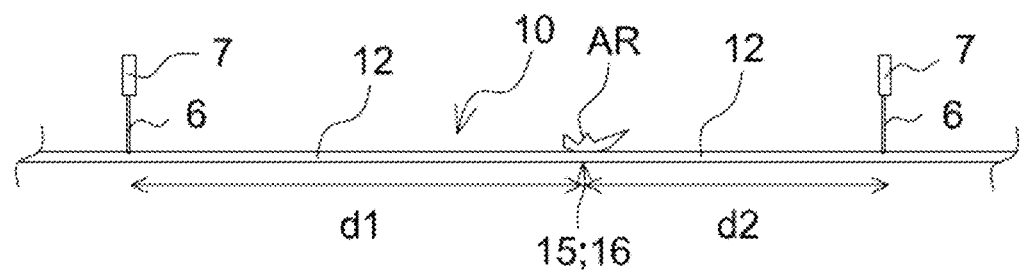

DEVICE FOR ACOUSTIC DETECTION OF AN ELECTRIC ARC

The present application is a U.S. National Phase of International Application Number PCT/EP2023/068589, filed Jul. 5, 2023, which claims priority to French Application No. 2206853, filed Jul. 5, 2022.

TECHNICAL FIELD

The field of the invention is that of electrical equipment, in particular cables, at which electric arcs can arise.

The invention relates more particularly to a technique for acoustic detection of an electric arc.

BACKGROUND

In many industries and, in particular, in the aeronautics industry, electrical wiring is critical equipment in electrical systems. Various phenomena such as the appearance of fragility in a cable over time, a manufacturing defect in a cable, an assembly problem or even a voltage overload of an element external to the cable, can lead to the formation of an electric arc at the cable. The electric arc can, in turn, be the source of embrittlement, lasting damage or disturbances (electrical or electromagnetic disturbances) of the electrical system.

In order to be able to intervene as quickly as possible, manufacturers are looking for techniques to detect the appearance of electric arcs.

The arc detection techniques based on current and voltage measurements are the most common. However, these techniques face the complexity of the wiring (too many cables, uncertainty about routing, etc.). This leads to the search for alternative or complementary detection techniques.

Patent documents EP 3232212, EP 2896969 and EP 3264116 describe devices for detecting electric arcs in an electrical installation, based on the detection of the acoustic wave that occurs in the presence of an electric arc. These devices are placed as close as possible to the possible electric arc (in contact with electrical terminals or in electrical modules of the installation) to detect the appearance of an electric arc at their location. These devices are therefore unsuitable for detecting the appearance of an electric arc over a long distance and, in particular, along an electric cable of several metres or tens of metres. These devices make it even less possible to locate the place, along the electric cable, where the electric arc was formed.

There is therefore a need for a detection device which overcomes, at least partially, the aforementioned drawbacks.

General Presentation

The invention relates to a device for acoustic detection of an electric arc. This device comprises a tubular probe suitable for being arranged next to a piece of electrical equipment on which an electric arc is likely to form. An interior space, circumscribed by a wall of the probe, extends along the length of the probe. This interior space, or lumen, is filled with a fluid and acoustically isolated from external noise by the wall. The probe comprises, at the periphery of its interior space, on its wall, at least one vulnerable zone suitable for degrading under the effect of the electric arc, revealing a passage to the interior space for an acoustic wave generated by the electric arc.

The device further comprises at least one acoustic sensor suitable for detecting the acoustic wave that travelled through the passage and propagated in the interior space of the probe.

The tubular probe is hollow to allow the acoustic wave to propagate in its interior space before reaching the acoustic sensor.

The probe can extend over a significant distance, for example over several metres. Since the acoustic wave propagates inside the probe, it is possible to detect the acoustic wave (and therefore the appearance of the electric arc) at a significant distance from the location where the electric arc is formed.

Such a device therefore allows remotely detecting the appearance of an electric arc at a piece of electrical equipment. In particular, the device can be used to detect the appearance of an electric arc along one or more electric cables, in which case the probe is arranged next to and along the electric cable(s). When the electric cables are assembled into a harness, the probe can be integrated into the harness.

The fluid filling the interior space of the probe can be air. Air has a definite advantage in avoiding fluid losses and leaks. Another fluid (gas, liquid or gel) could however, be used provided that it is not too viscous. Indeed, the less viscous the fluid, the greater the distance the acoustic wave can propagate. It is also possible, in order to increase the detection speed, to use fluids in which the propagation speed of the acoustic wave is more significant than in air. This is the case, in particular, for helium and, in general, for any gas having a specific perfect gas constant which is higher than air.

When the fluid is a gas, the acoustic sensor can be a microphone.

The wall of the probe is generally tubular in shape. This wall surrounds the interior space of the probe. It can be single-layer or multi-layer.

The probe has, at this wall, one or more vulnerable zones. Each vulnerable zone is adapted to be degraded, at least partially, under the effect of the electric arc, so as to reveal a passage to the interior space of the probe. The acoustic wave generated by the electric arc can then take this passage to penetrate into the interior space of the probe and propagate therein.

In certain embodiments, said at least one vulnerable zone is a fusible zone adapted to melt, at least partially, under the effect of the heat generated by the electric arc. However, phenomena of degradation of the material, other than fusion, such as phenomena of deformation or cracking, can be considered without departing from the scope of the invention. It is sufficient that the degradation of the vulnerable zone, caused by the electric arc, leads to the appearance of a passage for the acoustic wave towards the interior space of the probe.

When the probe has a vulnerable zone, it can extend along the probe. For example, the vulnerable zone may extend parallel to the axis of the probe or in a spiral around this axis. When the probe has a plurality of vulnerable zones, these may be distributed, regularly or not, along the probe.

In certain embodiments, said at least one fusible zone is formed by a fusible film which covers an opening passing through the wall. Such a film, when intact (i.e. not melted), seals the opening and contributes to insulating the interior space of the probe against external noise. By melting under the effect of the heat generated by the electric arc, the film frees the opening and the acoustic wave generated by the electric arc can then use the opening to reach the interior space of the probe and propagate therein.

In some embodiments, the fusible film has the ability to shrink under heat so that the film, when melting, does not risk obstructing the opening or the interior space of the probe. The opening and the interior space of the probe thus remain clear to allow the propagation of the acoustic wave.

In some embodiments, the fusible film covers, externally or internally, the entire wall. In other words, the film forms an internal or external jacket around the wall of the probe. Such a configuration, among other advantages, simplifies the manufacture of the probe while reinforcing the insulation against external noise outside the vulnerable zones.

In some embodiments, said at least one vulnerable zone is formed by a zone of reduced thickness of the wall. This zone, due to its reduced thickness, is more vulnerable than the rest of the wall and degrades under the effect of the electric arc.

When an electric arc is formed at the electrical equipment, it degrades the vulnerable zone and, due to this degradation, a passage to the interior space is formed at this zone. The acoustic wave generated by the electric arc then takes this passage and propagates in the interior space of the probe to the acoustic sensor located at a distance from the vulnerable zone.

The acoustic sensor can be in contact with the interior space of the zone, that is to say in direct communication with this space, or communicate indirectly with this space via a connection. For example, in certain embodiments, a pipe extends through the wall from the interior space of the probe to the acoustic sensor. The acoustic wave then passes through the interior space then through the pipe before reaching the acoustic sensor. This allows positioning the acoustic sensor at a distance from the probe. This configuration has an advantage, for example, when the probe is integrated into a cable harness. The acoustic sensor can then be positioned at the periphery of the harness or outside thereof. In order to facilitate the positioning of the sensor, the pipe may be flexible.

In some embodiments, the acoustic sensor is adapted to detect an acoustic wave whose frequency is less than 1000 Hz and, in particular, less than 500 Hz. Low-frequency acoustic waves are preferred because the attenuation of the amplitude of a wave, when it propagates in the interior space of the probe, is all the lower as its frequency is low.

In some embodiments, the section of the interior space of the probe is sufficiently large so that the acoustic attenuation along the probe is less than 2 dB/m for a wave with a frequency comprised between 100 Hz and 500 Hz. This allows positioning the acoustic sensor at a significant distance from the vulnerable zone. For example, the distance between the acoustic sensor and the vulnerable zone (i.e. the zone furthest from the sensor if there are several vulnerable zones) may be several metres, or even ten metres or more.

This distance may, in particular, be greater than two metres (2 m) and, more particularly, be greater than five metres (5 m).

In some embodiments, the device further comprises a calculation unit configured to determine, from the measurement signal of the acoustic sensor(s), the propagation time of the acoustic wave from the degraded vulnerable zone to the acoustic sensor(s) and to deduce therefrom the location of the electric arc. When the device is used for an electric cable, this allows locating the place, along the electric cable, where the electric arc has been formed.

The invention also relates to an assembly comprising a detection device as previously described and a harness composed of several electric cables, in which the probe is integrated into the harness and arranged along the electric cables. In particular, the electric cables of the harness can be circumferentially distributed around the probe.

In such an assembly, the detection device allows detecting the formation of an electric arc at any one of the cables.

The previously described features and advantages of the invention, as well as others, are illustrated in the following detailed description. This detailed description refers to the appended drawings.

BRIEF DESCRIPTION OF THE DRAWINGS

The appended drawings are schematic and are not necessarily to scale, they are intended above all to illustrate the principles of the invention. In these drawings, from one figure (fig) to the other, identical elements (or portions of elements) are identified by the same reference signs.

FIG. 1 This figure represents an example of a harness, in cross section.

FIG. 2 This figure represents the harness of FIG. 1 during the formation of an electric arc at one of the electric cables of the harness.

FIG. 3 This figure represents, in axial section, an example of an acoustic electric arc detection device.

FIG. 4 This figure represents, in axial section, another example of an acoustic electric arc detection device.

FIG. 5 This figure represents the device of FIG. 4 during the formation of an electric arc.

FIG. 6 This figure represents the propagation of an acoustic wave generated by the electric arc in the device of FIG. 5.

FIG. 7 This figure represents, in top view according to arrow VII, the probe of the device of FIG. 3 or FIG. 4.

FIG. 8 This figure represents the probe of FIG. 7 during the formation of an electric arc.

FIG. 9 This figure represents the theoretical acoustic attenuation in the air within tubes of different inner diameters, depending on the frequency of the acoustic wave propagating in the tube.

FIG. 10 This figure represents another example of an acoustic detection device for an electric arc.

DETAILED DESCRIPTION

Particular embodiments of the proposed detection device are described in detail below, with reference to the examples represented in the appended drawings. These embodiments illustrate the features and advantages of the invention. It is however recalled that the invention is not limited to these embodiments.

In these embodiments, the detection device comprises a tubular probe 10 adapted to be arranged next to a piece of electrical equipment, in particular an electric cable 1. The probe 10 is hollow, a wall 4 of the probe surrounding and delimiting an interior space 12. This interior space 12 is filled with a fluid, in this case air.

In the represented examples, in the absence of external mechanical stress, the probe 10 has a general shape of a cylinder of revolution, with an axis X. The lateral surface, or cylindrical surface, of the probe 10 corresponds to the outer face of the wall 4. The interior space 12 of the probe, or the lumen of the probe, extends along the axis X. The interior space 12 has a diameter D1 corresponding to the inner diameter of the probe 10. The probe 10 may be sufficiently flexible to be able to be curved, in which case the axis X becomes curvilinear. The probe 10 comprises at the periphery of its interior space 12, at the wall 4, vulnerable zones 15 distributed along the probe. The vulnerable zones 15 can be regularly distributed according to a spacing E.

The device further comprises at least one acoustic sensor, in this case a microphone 7 with a vibrating membrane, connected to the interior space 12 via a pipe 6.

FIG. 1 is a sectional view of an example of a harness 20 composed of several electric cables 1. These cables are grouped in a bundle within an envelope 2. The probe 10 is integrated in the centre of the harness 20 and the electric cables 1 are circumferentially distributed around the probe 10. The cables 1 are in contact with or at a short distance from the probe 10.

FIG. 2 is a sectional view, identical to FIG. 1, illustrating the formation of an electric arc AR at one of the electric cables 1. The electric arc AR is schematically represented by a cone. The electric arc AR emits an intense but local thermal field. For example, for an electric arc of more than 50 amperes (A), the temperature can reach more than 700° C. and the thermal gradient can be 500° C./mm, from the arc. The probe 10 being in the vicinity of the electric cable 1 at which the electric arc AR is formed, the temperature on the surface of the probe 10 can reach several hundred degrees (° C.).

The vulnerable zones 15 of the probe 10 are adapted to be degraded under the effect of the heat generated by the electric arc AR, leaving a passage 16 to appear towards the interior space 12 of the probe. An acoustic wave AO generated by the electric arc will then take this passage 16 (see the example of FIGS. 5 and 6).

The vulnerable zones 15 of the probe 10 can be produced in different manners. According to an exemplary embodiment (not represented), the wall 4 of the probe 10 is made of different materials, more or less heat-resistant, of which at least one material, the most sensitive to heat, is likely to be degraded or destroyed by the thermal field created by the electric arc AR. The vulnerable zones 15 are made of this sensitive material while the rest of the wall 4 is made of at least one more heat-resistant material.

According to another exemplary embodiment, shown in FIG. 3, the probe 10 is homogeneous in composition and the vulnerable zones 15 are zones at which the thickness of the wall 4 is reduced. This reduction in thickness is translated by the existence of hollows, or cavities 25, at the vulnerable zones 15. The cavities 25 may be present on the inner face of the wall 4, as illustrated in FIG. 3. The cavities 25 may also be formed on the outer face of the wall 4, in particular for practical manufacturing reasons.

According to another exemplary embodiment, shown in FIGS. 4 to 6, the wall 4 is repeatedly perforated with holes 5 of diameter D2, and is surrounded by a non-perforated film 3. In other words, the film 3 externally envelops the wall 4. The film 3 is fusible, that is to say adapted to melt under the effect of the heat generated by the electric arc. The material constituting the film 3 has a melting temperature which is lower than the temperature emitted by the electric arc AR, while the material constituting the wall 4 has a melting temperature which is higher than the temperature emitted by the electric arc AR.

FIG. 5 illustrates the appearance of an electric arc AR in the vicinity of the probe 10 and the radiation of the acoustic waves OA generated by the arc AR. The heat generated by the arc AR causes the melting of the portion of the film 3 closest to the arc and, thus, the exposing of one of the holes 5. The uncovered hole 5 then forms a passage 16 to the interior space 12 for the acoustic wave OA.

The melting of the film 3 must not lead to the filling of the hole 5 because, in this case, no passage 16 would be formed.

I order to avoid this, the film 3 is, for example, selected to be thin enough so that the molten material cannot fill the hole 5. Alternatively or in addition, the material constituting the film 3 can be selected so that the film 3 shrinks on itself when it melts.

The wall 4 of the probe can be more or less flexible depending on the intended application. For example, the wall 4 is flexible enough to be adapted to a given harness configuration 20.

For example, the wall 4 can be made of polymer (e.g. elastomer, silicone, fluoropolymer) or of metal. The film 3 can, for its part, be made of acrylonitrile butadiene styrene (ABS), polyoxymethylene (POM), or polyethylene (PE). For example, a stretchable polyethylene film 3 (whose melting temperature is comprised between 85 and 140° C.) having a thickness between 15 and 30 microns, can be associated with a flexible silicone wall 4 (whose melting point is in the range of 300° C.), at least 1 mm thick. According to another example, the wall 4 can be made of polytetrafluoroethylene (PTFE) (whose melting point is in the range of 330° C.)

After melting the film 3 and detecting the electric arc AR, a strip or a piece of film 3 can be deposited on the exposed hole 5 to cover it, so as to be able to reuse the probe 10.

FIG. 6 shows the transmission of the acoustic waves OA through the passage 16 formed by the exposed hole 5, the propagation on either side of the hole 5 in the interior space 12 and the propagation in the pipe 6 connected to the microphone 7. In the example of the figures, the holes 5 are circular, regularly disposed at a spacing E along the axis X of the probe 10 and alternately on either side of the probe 10 so as to form two rows of diametrically opposed holes (the spacing between two adjacent holes of the same row is therefore twice the spacing E). Of course, other shapes and other distributions of holes, e.g. other (angular) locations and other (non-regular) spacings can be considered without departing from the scope of the invention. The distribution of the holes 5 has an influence on the accuracy of the localization of the arc AR. The spacing E between holes 5 must allow one or more holes to be exposed when the fusible film 3 melts. For example, the spacing E can be millimetric or centimetric and depends on the temperature range to which the film is exposed. In particular, the spacing E between holes 5 can be comprised between 2 mm and 2 cm.

The inner diameter D1 of the probe 10 is selected so as to limit the attenuation of the acoustic wave OA during its propagation inside the probe 10. FIG. 9 shows the theoretical acoustic attenuation in air, at ambient temperature and pressure, within tubes (similar to the tubular probe 10) of different inner diameters, depending on the frequency of the acoustic wave propagating in the tube. The attenuation is denoted "Att" and expressed in decibels per metre (dB/m). The frequency is denoted "F" and expressed in hertz (Hz). The inner diameter of the tube is denoted "D1" and expressed in millimetres (mm). The attenuation is provided by the visco-thermal losses in the acoustic boundary layer on the periphery of the inner msurface of the tube. The thermo-viscous phenomena within a hollow tube generate an acoustic resistance and, by the same token, an attenuation of the amplitude of the propagated waves. As illustrated, the higher the inner diameter D1, the lower the acoustic attenuation. A diameter D1 which is greater than 3.2 mm, for example, provides an acoustic attenuation which is slightly less than 2 dB/m at 100 Hz. In this case, for a sound wave of frequency 100 Hz and for a propagation distance between 1 and 10 m, the amplitude attenuation varies between 2 and 20 dB.

In practice, the selection of the diameter D1 of the probe 10 results from a compromise between the volume available for the probe (e.g. the volume available within a harness in which the probe is integrated) and an acceptable attenuation with regard to the maximum propagation distance considered for the acoustic wave OA. For example, a diameter/propagation distance pair can be selected ensuring an acoustic attenuation of less than 20 dB. The maximum propagation distance considered is, for example, in the device of FIG. 6, the distance between the microphone 7 and the vulnerable zone 15A furthest from the microphone 7. Moreover, as illustrated in FIG. 9, for a given diameter D1, the attenuation is all the more significant as the frequency of the wave is high. Consequently, it may be interesting to favour the detection of low-frequency acoustic waves since these waves propagate with less attenuation in the interior space 12 of the probe 10. For this reason, the used microphone(s) 7 may be selected, preferably, to detect acoustic waves of a frequency which is lower than 1000 Hz and, in particular, lower than 500 Hz.

The diameter D2 of the holes 5 is also selected so as to limit the attenuation of the acoustic wave OA. The selection of this diameter D2 may, moreover, be constrained by the diameter D1 and by the selected perforation technique. In practice, the diameter D2 of the holes 5 may be millimetric. On this point, the inventors simulated the passage of a wave having a frequency of 200 Hz through a hole (similar to the hole 5) of 1 mm in diameter (similar to the diameter D2) formed in the wall of a tube (similar to the tubular probe 10) of 4 mm in inner diameter (similar to the diameter D1). The simulation took into account the hypotheses of excitation by monopole and thermo-viscous phenomena in the hole and the tube. If a wave located 1 mm from the wall of the tube produces an external parietal pressure in the range of 152 dB at the surface of the hole, the pressure inside the tube is homogeneous and in the range of 148 dB.

The attenuation of 4 dB produced by the crossing of the hole and the associated thermo-viscous effects is therefore relatively low and perfectly acceptable given the acoustic emission level of the electric arc and the dynamics of the microphones 7.

The propagation without attenuation of the acoustic wave OA in the interior space 12 of the probe 10 and the good detection of the acoustic wave OA also depend on the good acoustic insulation of the interior space 12 against external noise.

In the example of FIG. 3, the acoustic insulation (in the vulnerable zones 15 outside these zones 15) is ensured by the wall 4. In the example of FIGS. 4 to 6, the acoustic insulation is ensured by the film 3 in the vulnerable zones 15 and by the wall 4 outside these zones 15. In this regard, it will be noted that the cylindrical shape of the wall 4 and the film 3 greatly promote the provided acoustic insulation. Indeed, the curvature of the wall 4 and the film 3 causes a frequency, called the ring frequency, to appear below which the sound reduction index increases all the more as the frequency of the acoustic wave is low. This ring frequency is the frequency for which the longitudinal wavelength corresponds to the perimeter of the cylinder. Thus, for a tube with an outer diameter of 4 mm having a 1 mm thick elastomer wall and a ring frequency in the range of 76000 Hz, the theoretical sound reduction index is greater than 90 dB for a frequency of less than 200 Hz. By comparison, for a plate (without radius of curvature) made of 1 mm thick elastomer, the theoretical sound reduction index is only in the range of 5 to 6 dB. A method for detecting and locating an electric arc will now be described. With reference to FIG. 10. In this Figure, the detection device comprises a probe 10 comprising vulnerable zones 15 distributed along the probe. This probe 10 may be similar to the probe of FIG. 3 or that of FIG. 4. The device further comprises a series of microphones arranged so that, at a minimum, two microphones 71, 72, arranged on either side of a vulnerable zone 15, which is affected by an electric arc AR, detect the acoustic wave OA generated by this arc and which propagates inside the probe 10. For example, the spacing between two adjacent microphones 71, 72 may be metric. For example, this spacing may be comprised between 2 and 20 metres and, more particularly, between 5 and 20 metres.

The ends or terminations of the probe 10 are open to the outside or equipped with plugs which absorb the acoustic waves in order to avoid a phenomenon of reflection of the acoustic waves at these ends (i.e. an echo phenomenon). The acoustic waves OA propagate on either side of the vulnerable zone 15 at the speed c and are perceived by the two microphones 71, 72 at times t1 and t2, respectively. The distance separating the vulnerable zone 15 from the first microphone 71 is noted d1 and the distance separating the vulnerable zone 15 from the second microphone 72 is noted d2. The acoustic waves OA are perceived by the microphones 71, 72, with a time shift (t2−t1) representative of the difference in distance travelled. In this case:

$$d2 - d1 = c(t2 - t1) \qquad \text{[Math 1]}$$

The distance L=d1+d2 between microphones being predetermined, the position of the electric arc AR relative to the microphone 71 can then be easily deduced according to the equation:

$$d1 = \frac{(L - c(t2 - t1))}{2} \qquad \text{[Math 2]}$$

This calculation is carried out by a calculation unit (not shown) of the device receiving the measurement signals from the microphones 71, 72.

Such a method of locating the electric arc AR has the advantage of being reliable and relatively simple. However, other methods can be considered to locate the electric arc from the measurement signal from the acoustic sensor(s).

For example, in the case where the terminations of the probe 10 reflect the sound waves, the time signals at the output of the acoustic sensor(s) are representative of an incident wave and a retro wave propagated by the closest termination. The time shift between the wave detection as well as the distances between the acoustic sensor(s) and the terminations then allow determining the position of the arc.

According to another example, it is possible to carry out a frequency analysis to deduce the position of the arc using an acoustic propagation model of plane waves with visco-thermal attenuation and the calculation of the autospectra (SPL dB) of the acoustic sensors.

The embodiments described in the present disclosure are given for illustrative and non-limiting purposes, a person skilled in the art being able to easily, in view of this disclosure, modify these embodiments, or consider others, while remaining within the scope of the invention.

In particular, a person skilled in the art will be able to easily consider variants comprising only part of the features of the previously described embodiments, if these features alone are sufficient to provide one of the advantages of the invention. In addition, the different features of these embodiments can be used alone or be combined with each other. When combined, these features may be as described above or differently, the invention not being limited to the specific combinations described herein. In particular, unless otherwise specified, a feature described in connection with one embodiment may be applied analogously to another embodiment.

The invention claimed is:

1. A device for acoustic detection of an electric arc, comprising a tubular probe suitable for being arranged next to a piece of electrical equipment on which an electric arc is likely to occur,
   wherein an interior space, circumscribed by a wall of the tubular probe, extends along a length of the tubular probe, the interior space is filled with a fluid and acoustically isolated from external noise by the wall,
   wherein the tubular probe comprises, at a periphery of the interior space, on the wall, at least one vulnerable zone suitable for degrading under an effect of the electric arc, revealing a passage to the interior space for an acoustic wave generated by the electric arc,
   the device further comprises at least one acoustic sensor suitable for detecting the acoustic wave that travels through the passage and propagates in the interior space of the tubular probe.

2. The device according to claim 1, wherein said at least one vulnerable zone is a fusible zone adapted to melt under the effect of heat generated by the electric arc.

3. The device according to claim 2, wherein said fusible zone is formed by a fusible film which covers an opening passing through the wall.

4. The device according to claim 3, wherein the fusible film covers the entire wall externally or internally.

5. The device according to claim 3, wherein the fusible film has an ability to shrink under the heat.

6. The device according to claim 1, wherein said at least one vulnerable zone is formed by a zone of reduced thickness of the wall.

7. The device according to claim 1, comprising a plurality of vulnerable zones distributed along the tubular probe.

8. The device according to claim 1, wherein the fluid is air.

9. The device according to claim 1, wherein a pipe extends through the wall from the interior space of the tubular probe to the at least one acoustic sensor.

10. The device according to claim 1, wherein the at least one acoustic sensor is adapted to detect an acoustic wave with a frequency of less than 1000 Hz.

11. The device according to claim 1, wherein an inner diameter of the interior space of the tubular probe is sufficiently large so that an acoustic attenuation along the tubular probe is less than 2 dB/m for an acoustic wave having a frequency comprised between 100 Hz and 500 Hz.

12. The device according to claim 1, further comprising a calculation unit configured to determine, from a measurement signal from said at least one acoustic, a propagation time of the acoustic wave from a degraded vulnerable zone to the at least one acoustic sensor and to deduce a location of the electric arc therefrom.

13. An assembly comprising the device according to claim 1, and a harness composed of several electric cables, wherein the tubular probe is integrated into the harness and arranged along the several electric cables.

14. The assembly according to claim 13, wherein the several electric cables are circumferentially distributed around the tubular probe.

* * * * *